United States Patent
Mang et al.

(10) Patent No.: US 8,593,950 B2
(45) Date of Patent: Nov. 26, 2013

(54) METHOD AND APPARATUS FOR PROVIDING A WEIGHTED BANDWIDTH ALLOCATION FOR A NETWORK

(75) Inventors: Xiaowen Mang, Morganville, NJ (US); David Hoeflin, Middletown, NJ (US); Yonatan Levy, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 394 days.

(21) Appl. No.: 12/144,844

(22) Filed: Jun. 24, 2008

(65) Prior Publication Data

US 2009/0316578 A1   Dec. 24, 2009

(51) Int. Cl.
*G01R 31/08* (2006.01)
*H04J 3/16* (2006.01)

(52) U.S. Cl.
USPC ........... 370/230; 370/226; 370/229; 370/468; 709/233; 709/223; 709/226; 709/203; 705/87; 705/91; 705/93

(58) Field of Classification Search
USPC ......... 370/230, 329, 468, 235, 232, 498, 471, 370/395, 345, 226–229; 709/233, 223, 226, 709/203; 725/87, 91, 93, 96; 375/240; 348/384, 17, 462; 455/450, 464
See application file for complete search history.

(56) References Cited

U.S. PATENT DOCUMENTS

| | | | |
|---|---|---|---|
| 6,909,726 B1 * | 6/2005 | Sheeran ........................ | 370/468 |
| 7,215,678 B1 * | 5/2007 | Ahlfors et al. ................ | 370/412 |
| 7,324,523 B2 * | 1/2008 | Dacosta ................... | 370/395.41 |
| 7,324,553 B1 * | 1/2008 | Varier et al. .................. | 370/468 |
| 7,328,033 B2 * | 2/2008 | Rappaport et al. ............ | 455/500 |
| 2004/0133907 A1 * | 7/2004 | Rodriguez et al. .............. | 725/14 |
| 2007/0041384 A1 * | 2/2007 | Das et al. ................... | 370/395.4 |
| 2008/0056296 A1 * | 3/2008 | Kucuk et al. .................. | 370/442 |

* cited by examiner

*Primary Examiner* — Andrew Chriss
*Assistant Examiner* — Jamal Javaid

(57) ABSTRACT

A method and apparatus for providing bandwidth allocation for a network are disclosed. For example, the method receives data from a plurality of subscribers for transmission, and allocates a minimum reserved bandwidth to each of the plurality of subscribers. The method then allocates a portion of a shareable bandwidth to at least one of the plurality of subscribers in accordance with a weight factor.

10 Claims, 5 Drawing Sheets

METHOD AND APPARATUS FOR PROVIDING A WEIGHTED BANDWIDTH ALLOCATION FOR A NETWORK

The present invention relates generally to communication networks and, more particularly, to a method for providing a weighted bandwidth allocation for a network, e.g., Internet Protocol (IP) network, wireless network, etc.

BACKGROUND OF THE INVENTION

Internet services such as Voice over Internet Protocol (VoIP) are delivered to customers at any location with an Internet connection. A customer may access VoIP services via a variety of access networks such as cable networks, Digital Subscriber Line (DSL) networks, wireless networks, etc. Cable and DSL provide high speed broadband access on wired connections that limit the mobility of users. As more and more customers are accessing services using mobile end-devices, the wireless broadband access networks are becoming ubiquitous. A wireless broadband access technology called WiMax is one of the leading new access network technologies.

WiMax is able to support broadband access while not limiting users to wired connections. However, the bandwidth on WiMax network is shared among users in a given radio sector. If too many subscribers access the shared bandwidth simultaneously, congestion may occur and performance objectives may not be met for all or some customers.

SUMMARY OF THE INVENTION

In one embodiment, the present invention discloses a method and apparatus for providing bandwidth allocation for a network. For example, the method receives data from a plurality of subscribers for transmission, and allocates a minimum reserved bandwidth to each of the plurality of subscribers. The method then allocates a portion of a shareable bandwidth to at least one of the plurality of subscribers in accordance with a weight factor.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a weighted bandwidth allocation for networks. Although the present invention is discussed below in the context of wireless and Internet Protocol (IP) networks, the present invention is not so limited. Namely, the present invention can be applied for other packet networks.

Figure 1:
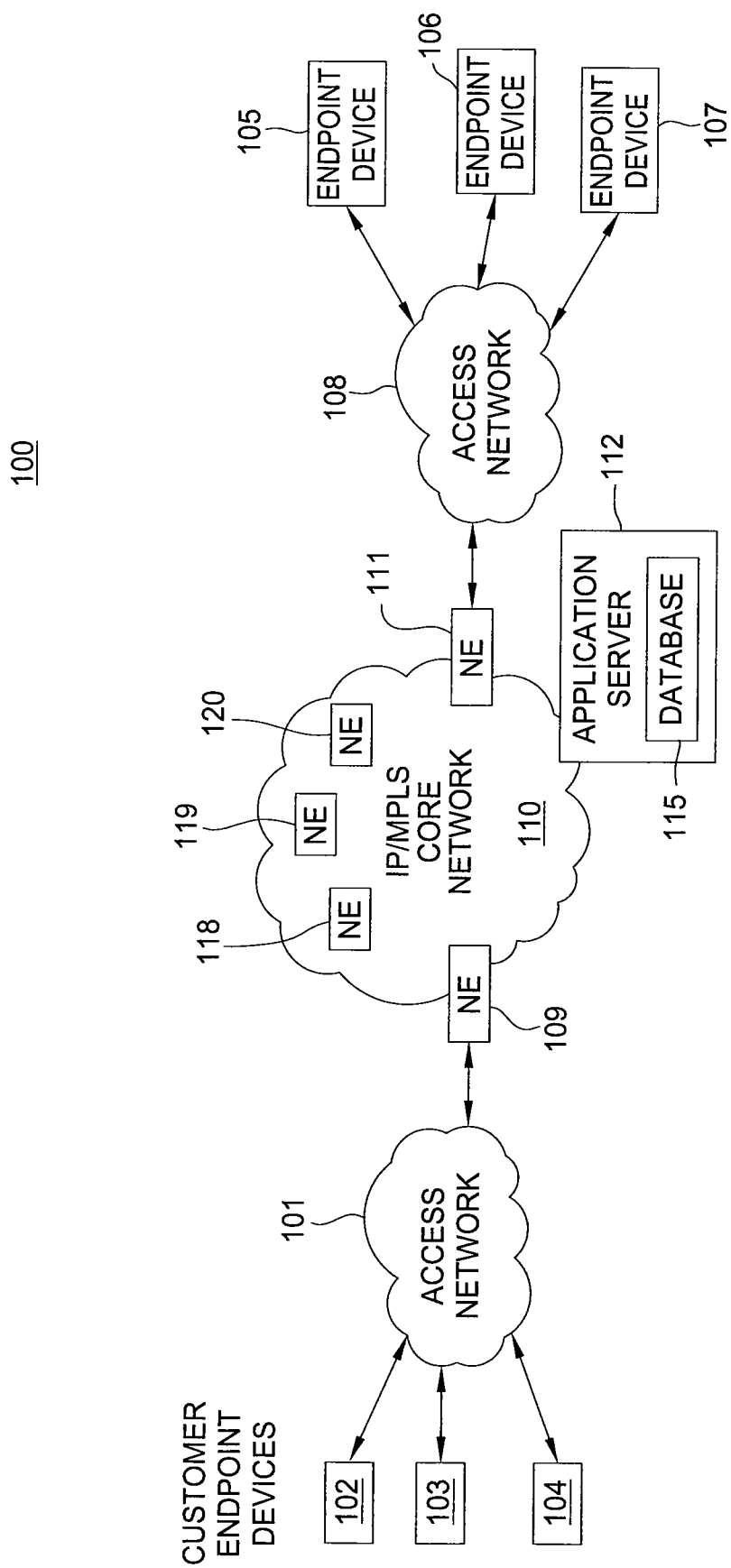
FIG. 1 is a block diagram depicting an exemplary packet network related to the current invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements, one application server are depicted in FIG. 1, the communication system 100 may be expanded by including additional endpoint devices, access networks, network elements, application servers, etc. without altering the present invention.

The above IP network is described to provide an illustrative environment in which packets for voice and data services are transmitted on networks. The current invention discloses a method and apparatus for providing bandwidth allocation for a network, a wireless access network used to access services such as VoIP. In order to clearly illustrate the teachings of the current invention, the following terminologies and networking concepts will first be described:

Worldwide Interoperability for Microwave Access (WiMax);
Subscriber Station (SS);
Base Station (BS);
Shareable bandwidth;
Minimum reserved bandwidth; and
Maximum sustained bandwidth.

Worldwide Interoperability for Microwave Access (WiMax) refers to a standards based technology enabling the delivery of last mile wireless broadband access according to IEEE 802.16 wireless network standards, as an alternative to cable and Digital Subscriber Line (DSL) broadband access networks.

Subscriber Station (SS) refers to a customer premise or endpoint device that is used to communicate with a base station (described below). It should be noted that the SS may be shared among other customer data and/or voice packet originating devices. For example, a router, a switch, etc. may be built with a radio frequency transmitter and receiver to communicate with a WiMAX tower that serves as a base station. In another example, the SS may be a laptop computer that is directly communicating with the BS.

Base Station (BS) refers to a transceiver station that is deployed to handle all incoming and outgoing calls from a plurality of subscriber stations.

Shareable bandwidth refers to the bandwidth that is left over after allocating all flows for services their minimum reserved bandwidth as described below.

Minimum reserved bandwidth is a service descriptor that defines a minimum bandwidth that a flow for a service can have. For example, the service provider and each customer may have a service level agreement stating a minimum throughput. The service provider may then use the information from the service level agreement to set a minimum reserved bandwidth for each customer.

Maximum sustained bandwidth is a service descriptor that defines a maximum bandwidth that a flow for a service can have. For example, a customer may have bursty traffic and may wish to have a maximum sustained bandwidth to handle the traffic bursts.

The total bandwidth a base station can support is divided into several sectors. The bandwidth for each sector varies depending on the environment and the distance between the subscriber stations and the base station. For example, in cities with physical obstructions the useful bandwidth may be limited to lower frequency transmissions, e.g. 2-10 GHz. If there are no physical obstructions, WiMAX transmissions may reach about 70 GHz. The bandwidth for each sector is shared by multiple subscriber stations. If there are too many simultaneous subscriber stations trying to access the bandwidth, congestion may occur.

Figure 2:
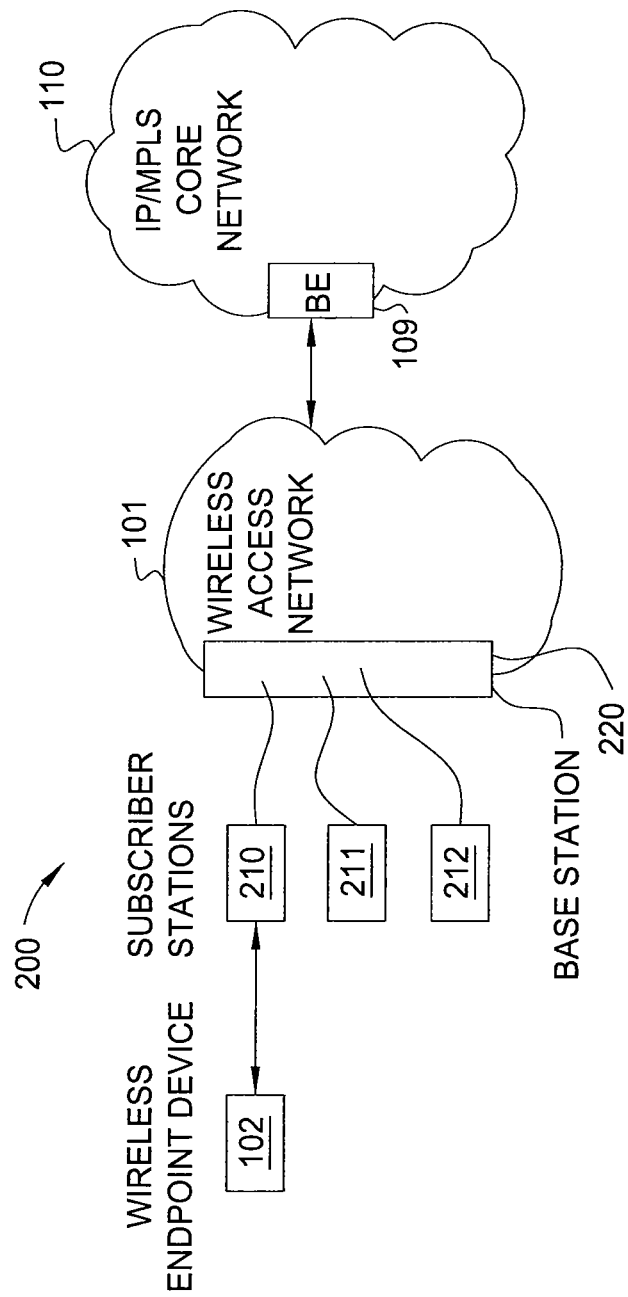
FIG. 2 illustrates an exemplary WiMAX access network.

FIG. 2 illustrates an exemplary WiMAX access network 200. For example, Subscriber Stations (SS) 210, 211 and 212 share Base Station (BS) 220. A wireless endpoint device 102 is connected to the SS 210 for sending and receiving packets. Base station 220 is located on a wireless access network 101. In one embodiment, the wireless access network 101 is connected to an IP/MPLS core network 110 through a gateway router or a border element 109. Although the current illustrative wireless network is a WiMax access network, those skilled in the art would realize that the wireless access network 101 may be a Wireless Local Area Network (WLAN), a Wireless Wide Area Network (WWAN) and the like.

In one embodiment, the current invention provides bandwidth allocation. For example, a wireless data service provider may offer its customers a variety of service levels with different profiles. For example, a service may have a profile describing a minimum reserved bandwidth and a maximum sustained bandwidth for each flow.

In one example, a customer A may prefer a service with a minimum reserved bandwidth of 100 Kbps and a maximum sustained bandwidth of 1 Mbps per flow. In another example, a customer B may prefer a service with a minimum reserved bandwidth of 50 Kbps and a maximum sustained bandwidth of 2 Mbps. Responsive to the customer's demand, the service provider may allocate both customers the minimum reserved bandwidth plus a portion of a shareable bandwidth.

In one embodiment, if the bandwidth allocation from the shareable bandwidth is in proportion to the minimum reserved bandwidth, the proportion of shareable bandwidth that customer A is allocated will be twice that of customer B. In contrast, if the bandwidth allocation from the shareable bandwidth is in proportion to the maximum sustained bandwidth, the proportion of shareable bandwidth that customer B is allocated will be twice that of customer A. However, a customer may expect the bandwidth allocation to be based on cost.

The current invention provides a method to allocate bandwidth based on a weight factor (described below) that integrates both the minimum reserved bandwidth and the maximum sustained bandwidth. The service provider may then provide services with a variety of profiles and allocate bandwidth for each flow based on the weight factor for the service.

In one embodiment, the weight factor is a parameter $\alpha$ with values $0 \leq \alpha \leq 1$. It should be noted that the weight factor can be set to other ranges as well without departing from the scope of the present invention. The weight factor is used to control the proportional contributions from the minimum reserved bandwidth and the maximum sustained bandwidth towards the weighted bandwidth for a flow. In one embodiment, the Weighted Bandwidth (WB) for a flow may be defined as:

$$WB = \alpha \times (\text{minimum reserved bandwidth}) + (1-\alpha)(\text{maximum sustained bandwidth})$$

WB is then a value between the minimum reserved bandwidth and the maximum sustained bandwidth. For example, when $\alpha = 0$, the WB equals the maximum sustained bandwidth. Similarly, when $\alpha = 1$, the WB equals the minimum reserved bandwidth.

In one embodiment, the method allocates the shareable bandwidth to each active flow in proportion with the WB value of the flow. For example, if there are 10 active flows and the WB value of a flow A is twice that of a flow B, then flow A is allocated twice the amount of shareable bandwidth as compared to that of flow B. In order to ensure the fairness of bandwidth sharing, the current method measures service flows and tracks the following parameters for each measurement period:

Number of bytes served for a service flow in a measurement period;

Average aggregate channel capacity B;

Shareable bandwidth SB; and

Shareable ratio of a service flow SR(i).

A measurement period refers to the time interval during which the number of bytes is counted. For example, in a WiMax network, the Media Access Control (MAC) layer defines the media format as an airframe. The airframe provides a unit of time for standardizing the measurement period for all flows over a WiMax network. For example, an airframe may be 5 ms, 10 ms, 20 ms, etc. The smallest measurement period is then 1 airframe of length 5 ms, 10 ms, 20 ms, etc. In one embodiment, the service provider may set the measurement period to be an integer number of airframes, e.g., 2 airframes, 10 airframes, etc. It should be noted that the present invention is not limited by the time duration of an airframe.

Data from each active service flow may then be packed into airframes and sent over a wireless link between one or more subscriber stations and a base station. Note that a single airframe may carry data from multiple subscriber stations.

In one embodiment, the number of bytes served in a measurement period for a service flow i is referred to as ST(i). The value of ST(i) increases in units of bytes whenever a user's packet from service flow i is being packed into an airframe. The value of ST(i) is reset to zero at the end of each measurement period.

In one embodiment, the average aggregate channel capacity, B, refers to the number of user data bytes (UB) per airframe divided by the length of the airframe (FT) in seconds. The current method estimates the average aggregate channel capacity by counting the number of user data bytes a fully packed airframe carried as described below.

For example, in a WiMax network, a subscriber station may communicate with a base station using different modulation schemes. Signal qualities dictated by various physical conditions determine which modulation scheme should be used. Furthermore, the modulation schemes for the uplink and downlink for the same subscriber station may be different. The bandwidth perceived by various subscriber stations using different modulation schemes may be different. Each subscriber may change the modulation scheme per airframe basis. Hence, the various combinations of different modulation schemes on a given radio sector may lead to variable aggregate achievable capacity for the sector. The instantaneous aggregate channel capacity may change over time. In one embodiment, the current method estimates the average aggregate channel capacity by counting the number of user data bytes a fully packed airframe carried. Specifically, $B=UB/FT$, for a measurement period.

In one embodiment, the value of B is updated after a fully packed airframe is transmitted. For example, B is a directional parameter. That is, the value of B for an uplink may be different from that of a downlink.

Once B is estimated, the shareable bandwidth may be determined by subtracting the minimum reserved bandwidth for all flows from B. That is, $SB=B-\Sigma_i \text{Minimum reserved bandwidth}(i)$, for all $i$, where, i indicates a service flow. SB then represents the bandwidth leftover after allocating all service flows their minimum reserved bandwidth. Note, that the service provider performs capacity planning to ensure that the shareable bandwidth is greater than zero.

The method then determines the shareable ratio of a flow i, SR(i) as the ratio of its weighted bandwidth to the sum of the weighted bandwidths of all flows. Then, $SR(i)=WB(i)/\Sigma_i WB(i)$.

In one embodiment, the shareable ratio SR(i) of a flow may then be used to determine whether a packet for the service flow i may be packed into an airframe.

Figure 3:
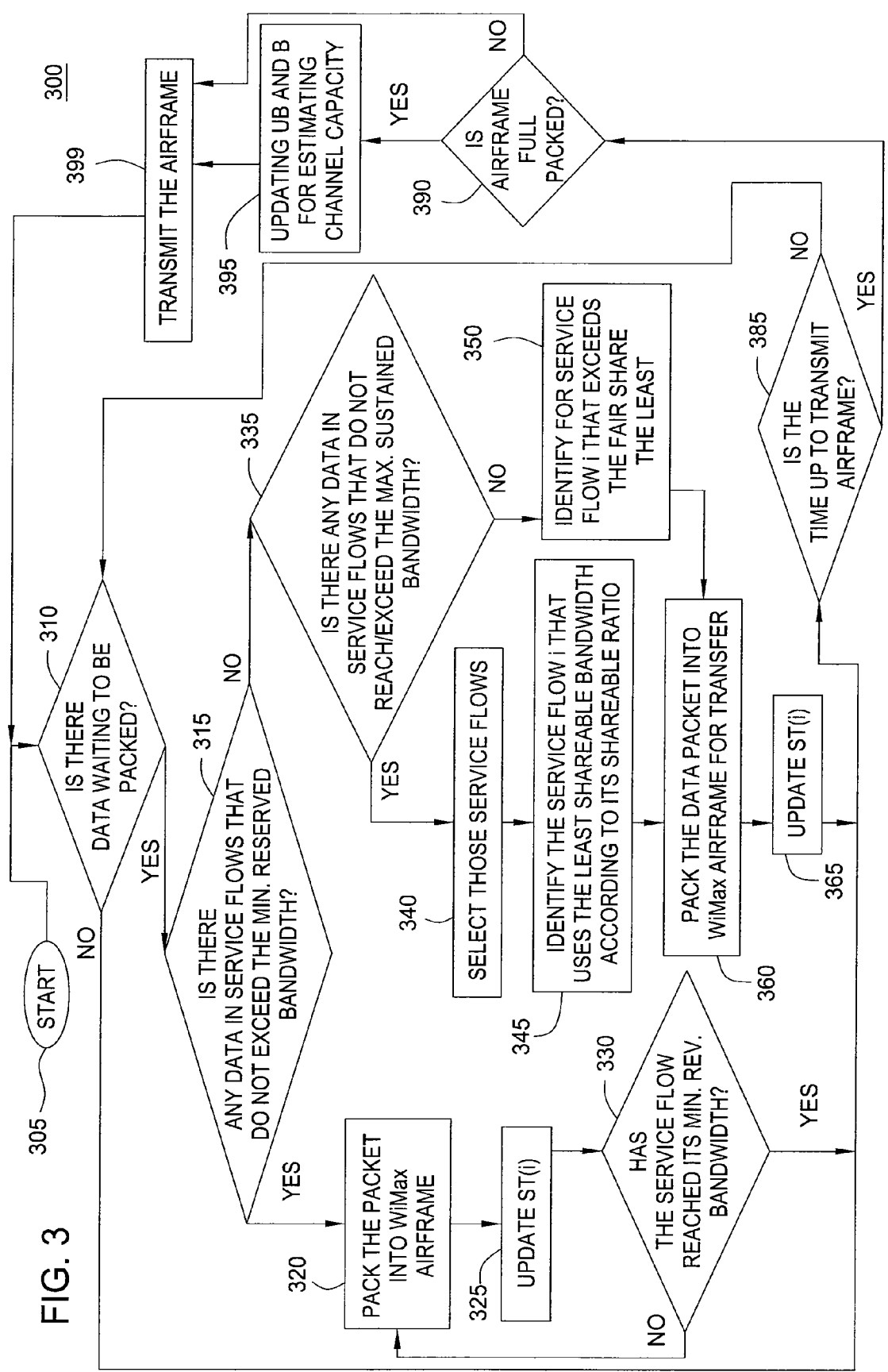
FIG. 3 illustrates a flowchart of a method for packing an airframe for a WiMax network.

FIG. 3 illustrates a flowchart of a method 300 for packing an airframe for a WiMax network. Method 300 starts in step 305 and proceeds to step 310.

In step 310, method 300 determines whether there is data waiting to be packed into an airframe. If there is data waiting to be packed, the method proceeds to 315. Otherwise, the method proceeds to step 385.

In step 315, method 300 determines if there is data waiting to be packed from a service flow that has not exceeded its minimum reserved bandwidth. For example, the method determines if there is any data waiting to be packed from a service flow i with ST(i)<minimum reserved bandwidth. If there is data waiting to be packed from a flow that has not exceeded its minimum reserved bandwidth, the method proceeds to step 320. Otherwise, the method proceeds to step 335.

In step 320, method 300 packs the data from a service flow that has not exceeded its minimum reserved bandwidth into the airframe. The method then proceeds to step 325.

In step 325, method 300 updates ST(i) for the service flow whose data is packed into the airframe. For example, the method updates the number of bytes served per measurement period for the flow that had data packed into the airframe. The method then proceeds to step 330.

In step 330, method 300 then determines if the service flow reached its minimum reserved bandwidth. For example, the method determines if the updated ST(i) is below the minimum reserved bandwidth. If the service flow reached the minimum reserved bandwidth, the method proceeds to step 385. Otherwise, the method proceeds back to step 320.

In step 335, method 300 determines if there is data waiting to be packed from a service flow that has not reached or exceeded its maximum sustained bandwidth. If there is data waiting to be packed from one or more service flows that have not exceeded/reached their maximum sustained bandwidth, the method proceeds to step 340. Otherwise, the method proceeds to step 350.

In step 340, method 300 selects the service flows that have not reached or exceeded their maximum sustained bandwidth. The method then proceeds to step 345.

In step 345, method 300 identifies the service flow that is using the least shareable bandwidth according to its shareable ratio. For example, the method may identify the flow associated with the $\text{Max}\{SB \times SR(i)-[ST(i)\text{per measurement period}-\text{minimum reserved bandwidth}(i)]\}$, for all active flows. The method then proceeds to step 360.

In step 350, method 300 identifies the service flow that exceeds its share of the shareable bandwidth by the least amount. For example, the method identifies the flow associated with the $\text{Max}\{SB \times SR(i)-[ST(i)\text{per measurement period}-\text{minimum reserved bandwidth}(i)]\}$, for all active flows. The method then proceeds to step 360.

In step 360, method 300 packs the data for the service flow identified in step 345 or step 350. For example, the method packs the data from the service flow that is using the least amount of its share of the shareable bandwidth (e.g., from step 345), or from the service flow that exceeds its share of the shareable bandwidth the least (e.g., from step 350). The method then proceeds to step 365.

In step 365, method 300 updates ST(i) for the service flow whose data is packed into the airframe. For example, the method updates the number of bytes served per measurement period for the flow that had data packed into the airframe. The method then proceeds to step 385.

In step 385, method 300 determines whether it is time to transmit the airframe. If it is time to transmit the airframe, the method proceeds to step 390. Otherwise, the method proceeds to step 310.

In step 390, method 300 determines if the airframe is fully packed. For example, there may not have been enough demand to fully pack the airframe. If the airframe is fully packed, the method proceeds to step 395. Otherwise, the method proceeds to step 399.

In step 395, method 300 updates the number of user data bytes per airframe and the average aggregate channel capacity. For example, the method updates UB and B based on the fully packed airframe. The method then proceeds to step 399.

In step 399, method 300 transmits the airframe. The method then proceeds back to step 310 to continue processing new data.

Figure 4:
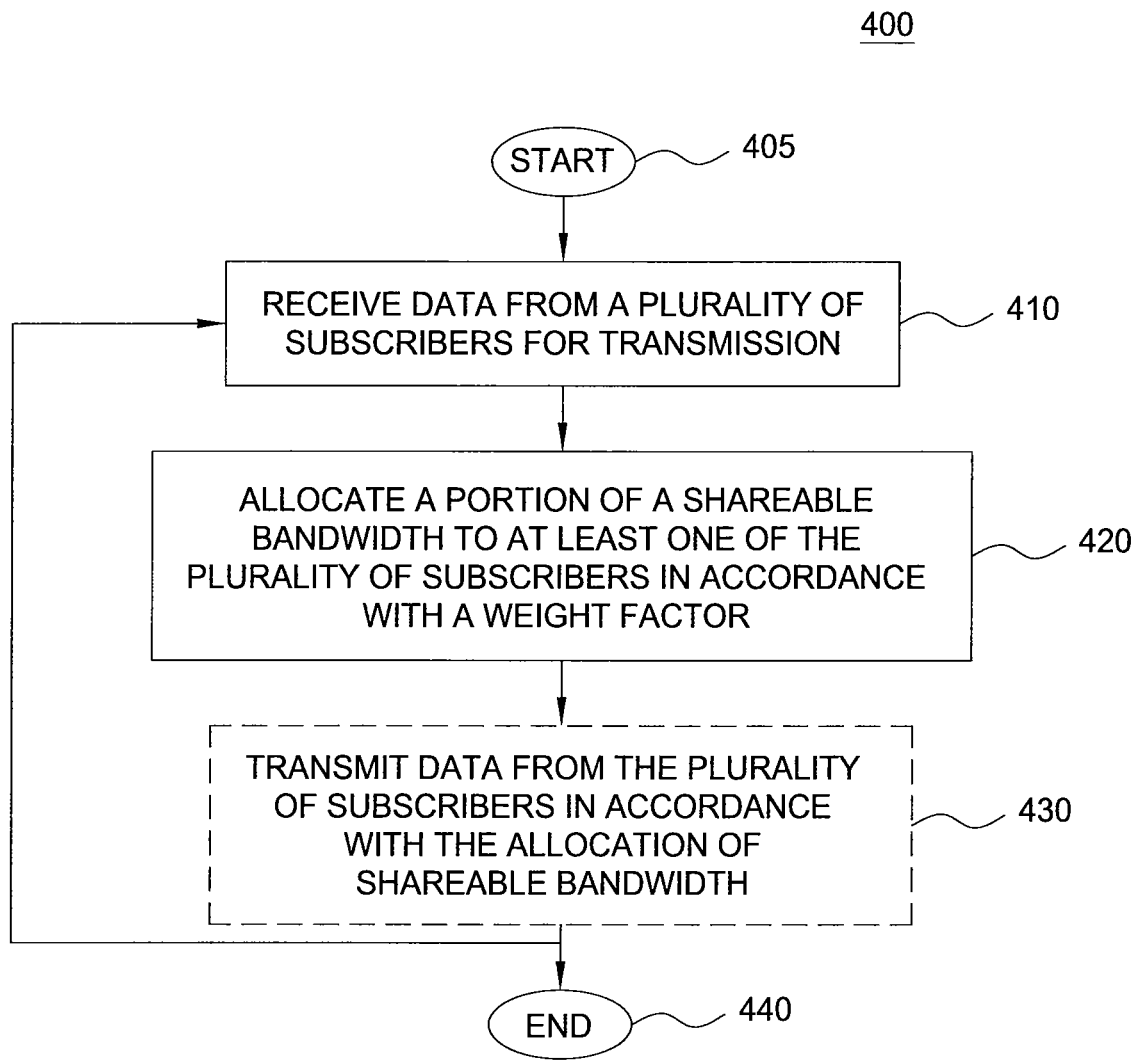
FIG. 4 illustrates a flowchart of a method for providing a weighted bandwidth allocation for a network.

FIG. 4 illustrates a flowchart of a method 400 for providing a weighted bandwidth allocation for a network. Method 400 starts in step 405 and proceeds to step 410.

In step 410, method 400 receives data from a plurality of subscribers for transmission. For example, one or more subscriber stations send data packets to a base station.

In step 420, method 400 allocates a portion of a shareable bandwidth to at least one of the plurality of subscribers in accordance with a weight factor. It should be noted that the shareable bandwidth only comprises bandwidth that is leftover after all of the subscribers have been allocated their minimum reserved bandwidth. Thus, one or more of the subscribers may be allocated additional bandwidth from the shareable bandwidth that is above their minimum reserved bandwidth. In one embodiment, the method allocates a portion of the shareable bandwidth based on α or a function of α. For example, for the method as illustrated in FIG. 3, a function of α may be used to compute the shareable ratio of flows.

In step 430, method 400 transmits data from the plurality of subscribers in accordance with the allocation of shareable bandwidth and the subscribers' minimum reserved bandwidth. The method then ends in step 440 or returns to step 410 to continue receiving data.

In one embodiment, the service provider may configure α in the base station. In another embodiment, α is configured in a network device implemented for traffic policy. For example, a method for determining the value of α may include a pricing policy.

In one embodiment, the service provider may configure the weight factor based on one or more of: a class priority, a type of service, a cost of service, a customer loyalty measurement, or a service level agreement (SLA). For example, services provided by a network service provider can be classified into one or more class priorities (e.g., first class priority—n class priority, or highest class priority—lowest class priority), e.g., voice related services can be classified into a higher class priority then data-only related services and so on. Furthermore, services can be grouped into various types, e.g., long distance services, local services, multimedia services, multicast services, unicast services, virtual private network services (VPN) and so on. To illustrate, the value for α can be set to a lower value for a high class priority, a first type service, a more expensive service, a service associated with a very loyal customer (e.g., a long term customer), or as defined in an SLA. In contrast, the value for α can be set to a higher value for a low class priority, a second type service, a less expensive service, a service associated with a new customer, or as defined in an SLA. For example, the service provider and the customer may have a service level agreement stipulating the minimum reserved bandwidth, maximum sustained bandwidth, and other performance-based parameters that will cause α to be set to a particular value for a customer.

In one embodiment, the weight factor may be set based on class or type priority. For example, services may have varying class priorities or type priorities set based on performance requirements, i.e., some services (e.g., transmission of voice packets) may have priority over other types of services (e.g., transmission of data packets) and so on. The shareable bandwidth may then be calculated on a per class basis.

It should be noted that although not explicitly specified, one or more steps of methods 300 and 400 may include a storing, displaying and/or outputting step as required for a particular application. In other words, any data, records, fields, and/or intermediate results discussed in the methods 300 and 400 can be stored, displayed and/or outputted to another device as required for a particular application. Furthermore, steps or blocks in FIG. 3 or FIG. 4 that recite a determining operation, or involve a decision, do not necessarily require that both branches of the determining operation be practiced. In other words, one of the branches of the determining operation can be deemed as an optional step.

Figure 5:
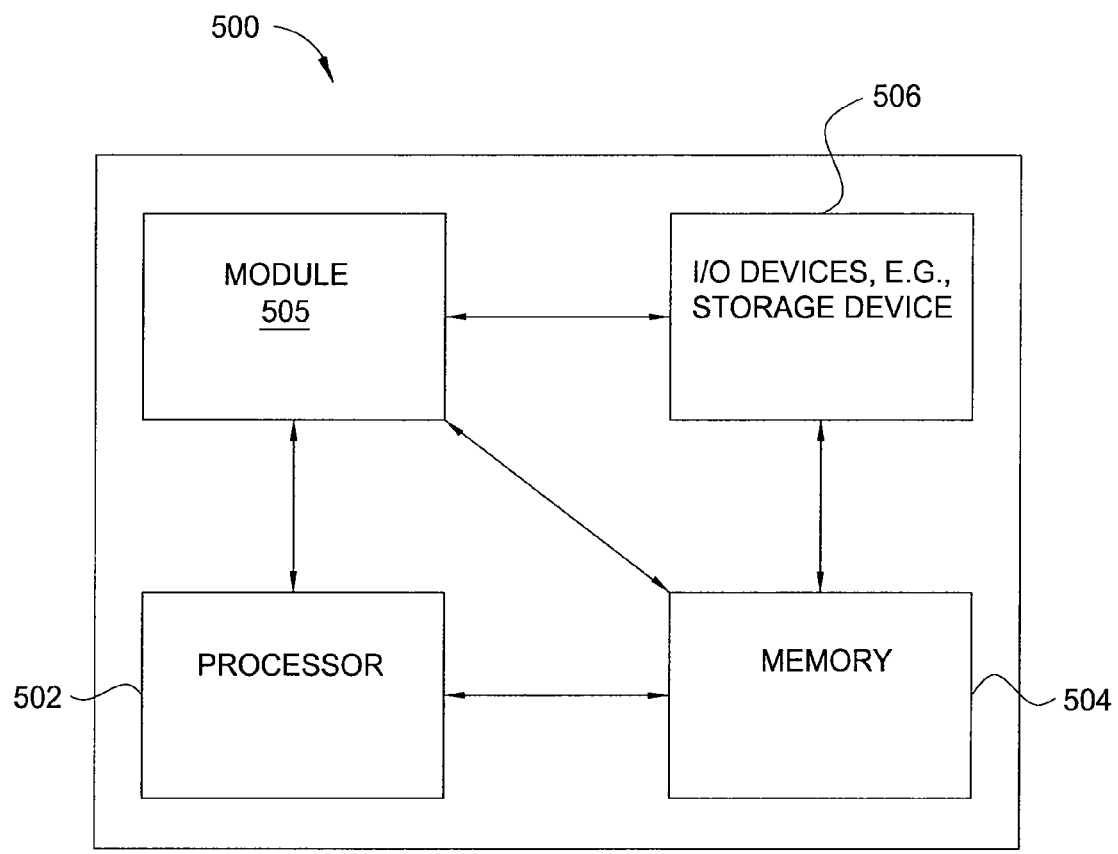
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a weighted bandwidth allocation for a wireless access network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for providing a weighted bandwidth allocation for a wireless access network can be loaded into memory 504 and executed by processor 502 to implement the functions as discussed above. As such, the present method 505 for providing a weighted bandwidth allocation for a wireless access network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for allocating a portion of a shareable bandwidth for a network, comprising:
    receiving, by a processor, data from a plurality of subscribers for transmission;
    allocating, by the processor, a minimum reserved bandwidth to each of the plurality of subscribers in accordance with a respective service level agreement for each of the plurality of subscribers; and
    allocating, by the processor, the portion of the shareable bandwidth to a subscriber of the plurality of subscribers in accordance with a weight factor, wherein the weight factor is assigned based on a customer loyalty measurement, wherein the shareable bandwidth comprises a leftover bandwidth after the allocating of the minimum reserved bandwidth to each of the plurality of subscribers, wherein the weight factor is used to determine a shareable ratio for a service flow associated with one of the plurality of subscribers, wherein the portion of the shareable bandwidth is allocated in accordance with the shareable ratio,
    wherein the shareable ratio for the service flow associated with one of the plurality of subscribers is determined by a weighted bandwidth associated with the service flow associated with one of the plurality of subscribers divided by a sum of a plurality of weighted bandwidths associated with a plurality of service flows associated with all other ones of the plurality of subscribers, wherein the weighted bandwidth is derived from the weight factor, the minimum reserved bandwidth, and a maximum sustained bandwidth associated each of the plurality of subscribers.

2. The method of claim 1, further comprising:
transmitting data from the plurality of subscribers in accordance with the allocation of shareable bandwidth and the minimum reserved bandwidth.

3. The method of claim 1, wherein the shareable bandwidth is derived in accordance with an average aggregate channel capacity.

4. The method of claim 3, wherein the average aggregate channel capacity comprises a number of user bytes per airframe divided by a length of the airframe.

5. A non-transitory computer-readable medium storing instructions which, when executed by a processor, cause the processor to perform operations for allocating a portion of a shareable bandwidth for a network, the operations comprising:
receiving data from a plurality of subscribers for transmission;
allocating a minimum reserved bandwidth to each of the plurality of subscribers in accordance with a respective service level agreement for each of the plurality of subscribers; and
allocating the portion of the shareable bandwidth to a subscriber of the plurality of subscribers in accordance with a weight factor, wherein the weight factor is assigned based on a customer loyalty measurement, wherein the shareable bandwidth comprises a leftover bandwidth after the allocating of the minimum reserved bandwidth to each of the plurality of subscribers, wherein the weight factor is used to determine a shareable ratio for a service flow associated with one of the plurality of subscribers, wherein the portion of the shareable bandwidth is allocated in accordance with the shareable ratio,
wherein the shareable ratio for the service flow associated with one of the plurality of subscribers is determined by a weighted bandwidth associated with the service flow associated with one of the plurality of subscribers divided by a sum of a plurality of weighted bandwidths associated with a plurality of service flows associated with all other ones of the plurality of subscribers, wherein the weighted bandwidth is derived from the weight factor, the minimum reserved bandwidth, and a maximum sustained bandwidth associated each of the plurality of subscribers.

6. The non-transitory computer-readable medium of claim 5, further comprising:
transmitting data from the plurality of subscribers in accordance with the allocation of shareable bandwidth and the minimum reserved bandwidth.

7. The non-transitory computer-readable medium of claim 5, wherein the shareable bandwidth is derived in accordance with an average aggregate channel capacity.

8. The non-transitory computer-readable medium of claim 7, wherein the average aggregate channel capacity comprises a number of user bytes per airframe divided by a length of the airframe.

9. An apparatus for allocating a portion of a shareable bandwidth for a network, comprising:
a processor; and
a computer-readable medium storing instructions which, when executed by the processor, cause the processor to perform operations, the operations comprising:
receiving data from a plurality of subscribers for transmission; allocating a minimum reserved bandwidth to each of the plurality of subscribers in accordance with a respective service level agreement for each of the plurality of subscribers; and
allocating the portion of the shareable bandwidth to a subscriber of the plurality of subscribers in accordance with a weight factor, wherein the weight factor is assigned based on a customer loyalty measurement, wherein the shareable bandwidth comprises a leftover bandwidth after the allocating of the minimum reserved bandwidth to each of the plurality of subscribers, wherein the weight factor is used to determine a shareable ratio for a service flow associated with one of the plurality of subscribers, wherein the portion of the shareable bandwidth is allocated in accordance with the shareable ratio,
wherein the shareable ratio for the service flow associated with one of the plurality of subscribers is determined by a weighted bandwidth associated with the service flow associated with one of the plurality of subscribers divided by a sum of a plurality of weighted bandwidths associated with a plurality of service flows associated with all other ones of the plurality of subscribers, wherein the weighted bandwidth is derived from the weight factor, the minimum reserved bandwidth, and a maximum sustained bandwidth associated each of the plurality of subscribers.

10. The apparatus of claim 9, wherein the operations further comprise:
transmitting data from the plurality of subscribers in accordance with the allocation of shareable bandwidth and the minimum reserved bandwidth.

* * * * *